United States Patent
Ward et al.

Patent Number: 6,104,930
Date of Patent: *Aug. 15, 2000

[54] FLOATING TRANSCEIVER ASSIGNMENT FOR CELLULAR RADIO

[75] Inventors: Christopher Robert Ward, Bishop's Stortford; Andrew William Jeffries, Saffron Walden; Keith Stewart Wilson, Bishop's Stortford, all of United Kingdom

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/850,574

[22] Filed: May 2, 1997

[51] Int. Cl.$^7$ ...................................................... H04B 1/00
[52] U.S. Cl. ........................... 455/450; 455/452; 455/453; 455/562
[58] Field of Search .................................... 455/450, 452, 455/453, 446, 447, 448, 509, 524, 562

[56] References Cited

U.S. PATENT DOCUMENTS

| | | | |
|---|---|---|---|
| 5,515,378 | 5/1996 | Roy, III et al. | 455/450 |
| 5,559,866 | 9/1996 | O'Neill | 455/447 |
| 5,602,555 | 2/1997 | Searle et al. | 455/562 |
| 5,603,089 | 2/1997 | Searle et al. | 455/562 |
| 5,628,052 | 5/1997 | DeSantis et al. | 455/562 |
| 5,701,596 | 12/1997 | Meredith et al. | 455/562 |

FOREIGN PATENT DOCUMENTS

| | | |
|---|---|---|
| 0 201 254 | 11/1986 | European Pat. Off. . |
| 0 329 997 | 8/1989 | European Pat. Off. . |
| 0 359 535 | 3/1990 | European Pat. Off. . |
| 0 639 035 | 11/1996 | WIPO . |
| WO 96/38011 | 11/1996 | WIPO . |

OTHER PUBLICATIONS

Proposed Advanced Base Station Antennas for Future Cellular Mobile Radio Stations.
A Spectrum Efficient Cellular Base–Station Antenna Architecture.

*Primary Examiner*—Daniel S. Hunter
*Assistant Examiner*—Thuan T. Nguyen
*Attorney, Agent, or Firm*—Lee, Mann, Smith, McWilliams, Sweeney & Sweeney

[57] ABSTRACT

A frequency allocation method for allocating carrier frequencies to a plurality of fixed beams in a cellular radio based transceiver station comprises maintaining a reserve pool of carrier frequencies, such that any available carrier frequency can be allocated to any fixed beam at any one time in order to deal with capacity demands from mobile stations within an area covered by a fixed beam. A frequency allocation algorithm operates such as to allow a plurality of transceivers to float anywhere across a plurality of fixed directional beams. More carrier frequencies can be added to a beam to deal with increased mobile station capacity demand. The occupancy of channels on the carrier frequencies is continuously monitored, and the number of carrier frequencies per beam is continuously monitored, with the object of releasing unused carrier frequencies to a reserve pool of carrier frequencies, allowing re-deployment of unused carrier frequencies to other beams where necessary. Carrier frequencies are periodically "groomed" by assessing the number of vacant channels on the carrier, and reallocating any un-utilized vacant channels to other carrier frequencies. The grooming process can be constrained to operate during natural gaps in speech, to avoid channel degradation.

15 Claims, 11 Drawing Sheets

Beam 1: $f_1(C_1, C_2, C_3), f_7(C_7, C_8, C_{10}), f_{12}(C_{20}, C_{32}, C_5), f_{20}(C_{12}, C_{21}, V),$
$f_{31}(C_{30}, V, V)$ Beam 2: $f_{26}(C_{50}, C_{48}, C_4), f_{36}(C_5, C_{29}, V), f_{42}(C_{22}, V, V)$ Beam 3: ------

Beam 7: $f_{70}(C_{120}, C_{108}, C_{28}), f_{90}(C_{33}, C_{99}, V)$

FLOATING TRANSCEIVER ASSIGNMENT FOR CELLULAR RADIO

FIELD OF THE INVENTION

This invention relates the field of cellular radio communications systems, and particularly to a method and apparatus for allocating carrier frequencies to a plurality of beams.

BACKGROUND OF THE INVENTION

Cellular radio systems are currently in widespread use throughout the world providing telecommunications to mobile users. Available frequency bands for mobile communications are divided up into a number of carrier frequencies. In order to meet the demand for transmission capacity within an available frequency band allocation, cellular radio systems divide a geographic area to be covered into a plurality of cell areas. Each cell is provided with a base station with which a plurality of mobile stations within the cell communicate.

In general, an object of cellular radio communication system design is to have as few base stations as possible, since base stations are expensive, and require extensive effort in obtaining planning permission and in some areas, suitable base station sites may not be available.

In order to have as few base stations as possible, each base station ideally has as large a capacity as possible so as to service as large a number of mobile stations as possible. However, there are fundamental limits on the maximum user capacity of a base station for serving mobile stations because the number of mobile stations which can be served by a base station depends upon the available number of carrier frequencies, and these carrier frequencies are a limited resource in the frequency spectrum. In order to physically separate radiations at the same or closely matching frequencies, it is known to make use of directional antennas which produce directional radiation beams on the downlink (base station to mobile communication). The use of directional radiation beams allows greater reuse of carrier frequencies, and increases system capacity compared with omni-directional antennas.

The type of antenna used at the base station site can potentially make significant improvements to the capacity of a cellular radio system. The conventional approach is to use omni-directional antennas, broadly directional tri-sectored antennas or hex-sectored antennas.

Figure 1:
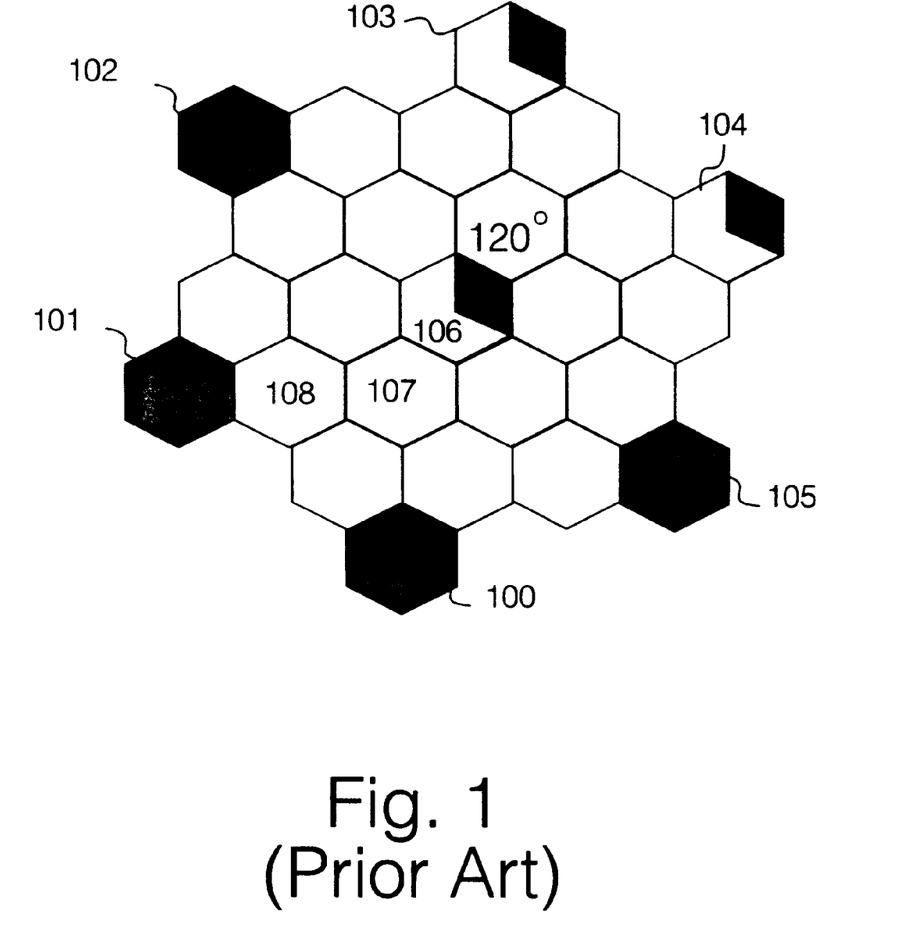
FIG. 1. schematically illustrates the prior art principal of sectorization as used in cellular radio systems.

The use of directional antennas in current cellular radio systems is based upon the principle of sectorization, as illustrated in FIG. 1 herein which shows schematically an area covered by a cell pattern in which a plurality of nominally hexagonal cells in a N=7 cluster size hexagonal pattern are each divided into three sectors, each spanning a range of 120° azimuth. The main source of interference comes from mobile stations in the so called first tier reuse cells 100–105, which in the example of FIG. 1 are spaced apart from a center cell 106 by a distance of at least two intermediate cells, for example, cells 107, 108. Using omni-directional antennas, the base station antenna in center cell 106 receives interference from mobile stations in all six first tier reuse cells 100–105. However, if an antenna has a nominal 120° beam width corresponding to a cell sectorized into three sectors (a tri-sectorized configuration) interference is received from mobile stations in only two first tier re-use cells, 100, 101. The situation can be improved by using an antenna with a 60° beam width, corresponding to a hex-sectored configuration, in which case interference is received from mobiles in only one of the first tier cells.

Figure 2:
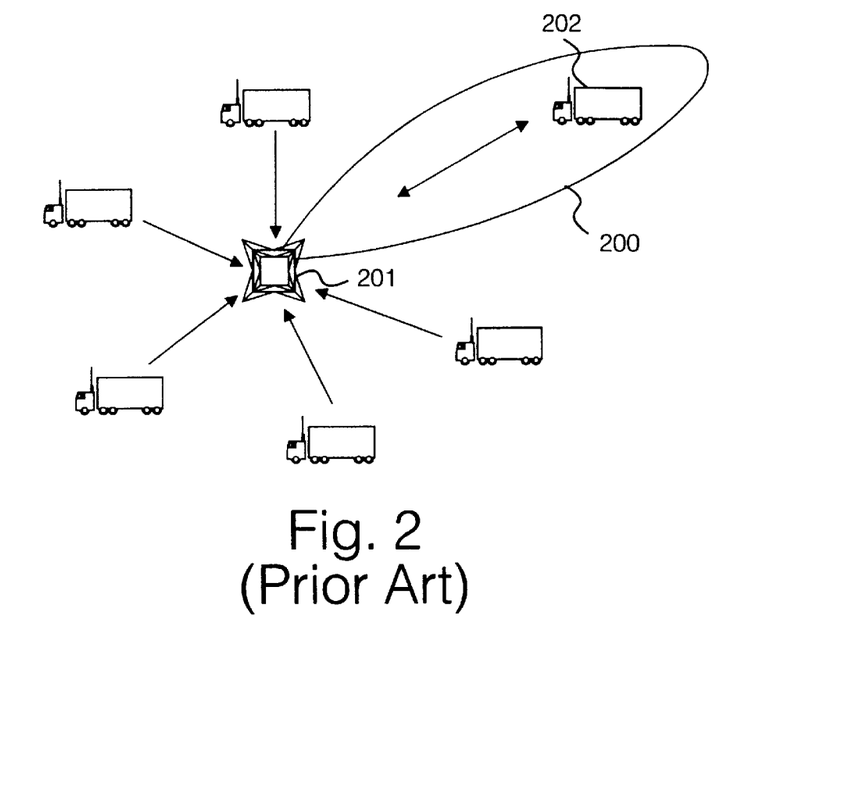
FIGS. 2 and 3 illustrate schematically the use of a narrow beam antenna to communicate between a base station and a mobile station as is known in the art.
Figure 3:
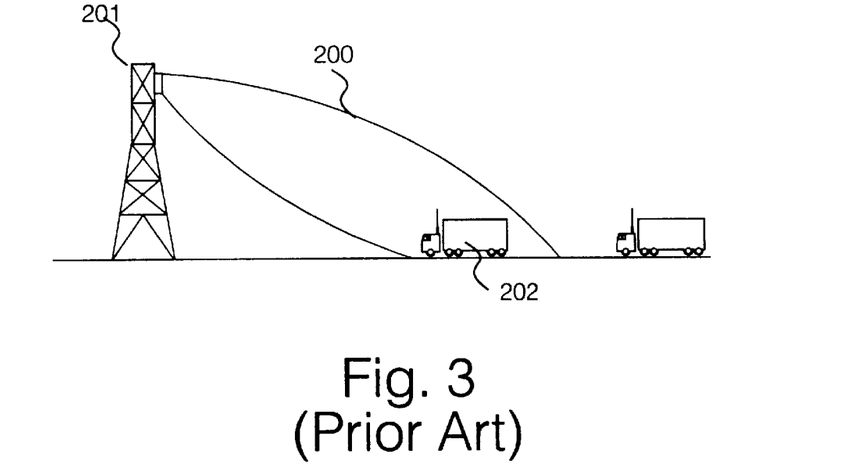

One previously suggested approach to increase system capacity by increasing frequency re-use is that of a base station antenna pattern comprising beams of narrow angular widths in both azimuth and elevation as shown in FIGS. 2 and 3 herein. Prior art literature recognizes many of the potential benefits of narrow beam antennas[1, 2]. Although a narrow radiation beam is formed at radio frequencies typically in the 900 MHz, 1800 MHz or 1900 MHz bands, a narrow beam can usefully be visualized as analogous to search light beams which emanate from the base station, and track the mobiles. When contrasted with an omni-directional tri-sectored antenna, this creates a high quality transmission path with minimal interference. A plurality of such narrow beams are provided in each 120° sector. A narrow radiation beam 200 may be directed by a base station smart antenna 201 at a desired mobile station 102, and tracks the mobile's movements. When compared to an omni-directional antenna, such a narrow beam has dual benefits of having high gain, leading to increased range in a thermal noise limited environment, and of rejecting interference from cells employing co-frequency reuse, due to spatial separation of beams, thereby allowing higher capacity in a cell without cell splitting. A capacity increase is obtained by tighter frequency reuse across the network. For the purposes of this document, the use of the word "omni-directional" is intended to convey the meaning of having radiation coverage over an area corresponding to substantially the whole geographic area of a cell.

Where each cell has a number of narrow smart antennas having narrow beams which track individual mobiles, there results a reduction in overall carrier to interference (C/I) ratio due to the statistical probability that different beams re-using the same carrier frequency will be pointing in different directions, having different azimuth and different elevations. The randomized locations of mobiles (and hence beam direction) means that there is a low likelihood of intercept interference, and the likelihood of two or more beams of a same carrier frequency intercepting each other is diminished. The narrower the beams, the lower the probability that a mobile will intercept a same frequency beam of a different cell in which the carrier frequency is re-used.

The extent of the advantage of a narrow beam antenna over an omni-directional antenna is a function of the beam width of the narrow beam antenna, and the narrower the beam width, the greater the advantage in terms of C/I performance. However, narrow beam antennas have increased size and complexity compared with omni-directional antennas and there are key disadvantages in the approach of using a large number of narrow directional antennas in a sectorized approach.

The cellular radio transceivers are dedicated to particular sectors, which leads to significant levels of trunking inefficiency. In practice, this means that many more transceivers are needed at the base station site than for an omni-directional cell of the same capacity.

Each sector is treated by the cellular radio network (i.e. the base station controller and mobile switches) as a separate cell. This means that as a mobile moves between sectors, a considerable interaction is required between the base station and the network in order to hand off the call between sectors of the same base station. This inter-action comprises signaling and processing at the base station controller and switch and represents a high overhead on the network, and reduces capacity.

Figure 4:
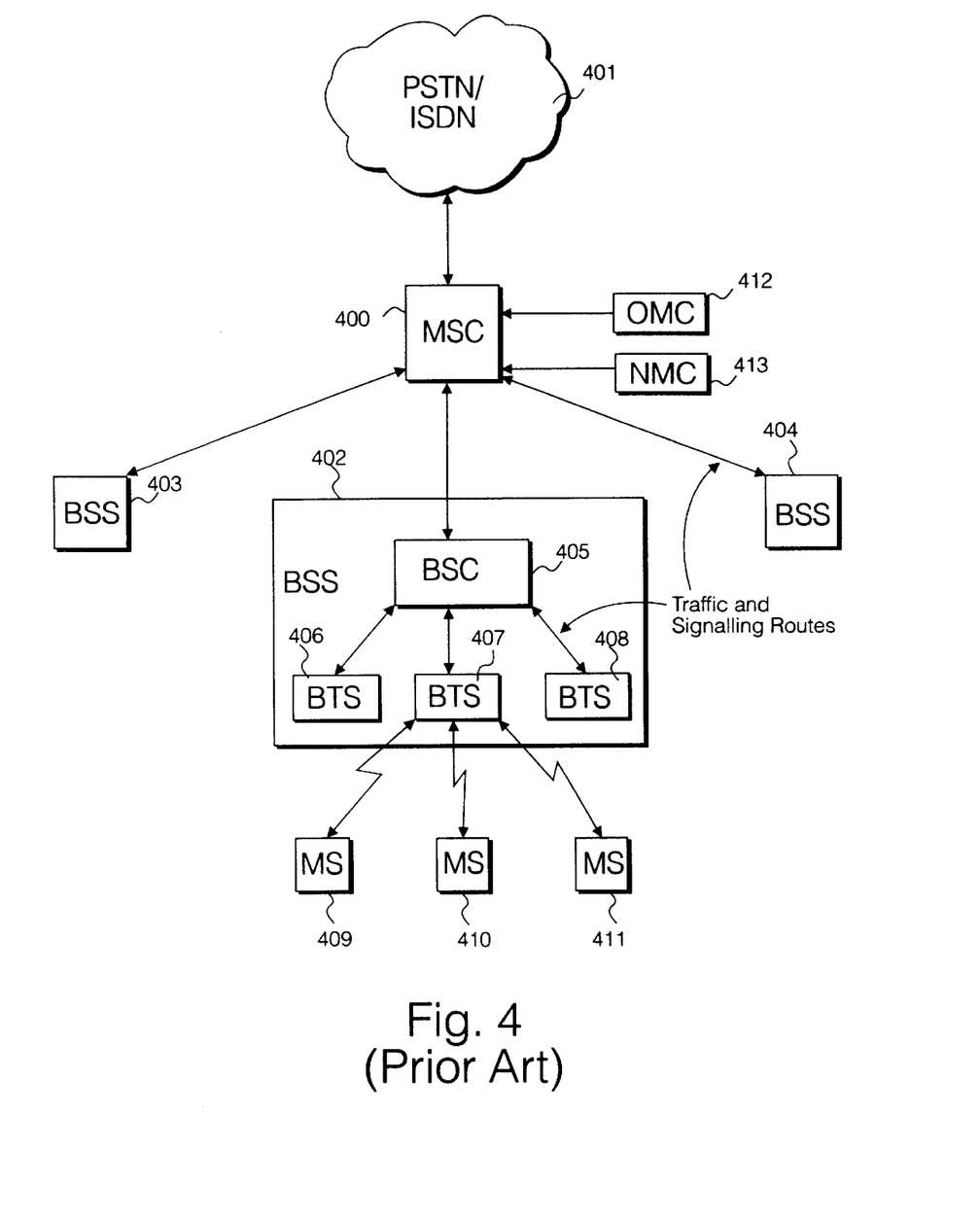
FIG. 4 illustrates schematically the structure of a prior art cellular radio base station.

The problem can be illustrated by considering the operations necessary or frequency allocation in relation to a structure of a base station. Referring to FIG. 4 herein, a conventional cellular radio system comprises several layers including a mobile switching center (MSC) 400 which provides an interface between the cellular system and other networks, for example, the public switched telephone network (PSTN), or integrated service digital network (ISDN) 401. Each mobile switching center 400 controls several base station systems (BSS) 402–404 which in some systems such as the Groupe Système Mobile (GSM) or PCS 1900 systems are further divided into a base station controller (BSC) 405 which controls several base transceiver stations (BTS) 406–408. Each base transceiver station communicates with several mobile stations (MS) 409–411. At the mobile switching center level, there are also other facilities such as operations and maintenance controller (OMC) 412 and network management controller (NMC) 413 apparatus. In the conventional cellular radio system, calls are allocated to transceivers at base band in the cellular radio network, at either the base station controller if available, or at the mobile station controller, as shown in FIG. 4 herein. Any change required in handing over a call to a different transceiver has to be signaled through the network, possibly as far as the mobile station controller, and back again.

In some cases, the approach of using a large number of narrow beams to increase system capacity encounters further problems to those identified above. In particular, as described later in this document in the North American Digital-AMPS system the beams must be spatially fixed, and cannot be steered to follow a mobile station. Using a large number of directional beams under these circumstances introduces additional problems in trunking inefficiency.

SUMMARY OF THE INVENTION

One object of the present invention is to overcome the trunking inefficiency experienced in cellular radio systems using a plurality of narrow directional beams.

Another object of the present invention is to increase capacity in a cell whilst maintaining an acceptable carrier to interference ratio.

Specific methods and embodiments according to the present invention adopt an approach of having a cell served by a plurality of directional beams, each capable of operating at a plurality of carrier frequencies, wherein the carrier frequencies can be floated anywhere across the plurality of beams, so as to allocate at any one time any carrier frequency to any one beam.

According to a first aspect of the present invention there is provided, in a cellular radio communications system comprising:

a plurality of transceivers each operating a transmission signal at a different carrier frequency; and an antenna arrangement capable of operating a plurality of directional beams, a method of allocating a set of carrier frequencies to said plurality of beams, wherein;

any said carrier frequency can be allocated to any said beam; and a variable number of said carrier frequencies can be allocated to a particular beam according to a communications traffic requirements.

Said directional beams may comprise downlink or uplink beams. Said downlink beams suitably comprise directional radiation beams generated by said antenna. Said uplink beams suitably comprise spatial zones of high gain sensitivity to received signals generated by transmitting entities such as mobile stations.

Preferably, the method comprises the steps of:

reviewing on a continuous basis a number of carrier frequencies allocated to each said beam; and minimizing a number of carrier frequencies allocated to each said beam at any one time.

Preferably, said method comprises the step of maintaining a pool set of said transceivers in an unallocated state in which respective carrier frequencies of said pool set of transceivers are unallocated to any said beam.

Preferably, a said carrier frequency comprises a plurality of communications channels. Said plurality of communications channels may comprise time division multiplexed time slots. Preferably, said beams are spatially fixed.

Preferably, the method comprises the step of for a call originating in a zone covered by more than one said beam, determining an allocation of which beam to use, depending upon a traffic loading of each of said covering beams covering said zone.

According to a second aspect of the present invention there is provided a method of allocating a plurality of carrier frequencies to a plurality of radiation beams generated by an antenna of a cellular radio system, wherein each said carrier frequency is multiplexed to carry a plurality of communications channels, said method comprising the steps of:

for a said beam:

monitoring a number of channels for each carrier frequency of said beam;

monitoring a demand for communications calls on said beam, and when a new communications call is required to be added to said beam, if a vacant channel is available on an existing carrier frequency of said beam, adding said communications call to said existing carrier frequency of the beam, and if a vacant channel is unavailable on an existing carrier frequency of said beam, allocating a new carrier frequency to the beam.

According to a third aspect of the present invention there is provided a method of reallocating a plurality of carrier frequencies of a beam of an antenna of a cellular radio system, wherein each said carrier frequency carries a plurality of communications channels, said method comprising the steps of:

monitoring said plurality of channels on said beam; and if said beam has more than a predetermined number of vacant channels, reallocating any utilized channels between said plurality of carrier frequencies of said beam; and removing a said carrier frequency from said beam.

The re-allocation may be constrained to re-allocate the utilized channels to other carrier frequencies only when a gap in communications occurs on the utilized channel degradation from a channel users perspective.

Preferably, each carrier frequency carries a number of channels and said predetermined number is at least said number of channels carried by a carrier frequency.

According to a fourth aspect of the present invention there is provided a base station antenna arrangement comprising:

an antenna capable of forming a plurality of directional beams;

a plurality of transceivers, each said transceiver operating at a different carrier frequency;

a switch matrix means operating to switch any said transceiver to any said beam;

a monitoring means for monitoring a number of carrier frequencies assigned to a said beam; and a control means operating to determine allocation of said carrier frequencies to said beams and to control said switch matrix to switch said transceivers to said beams accordingly.

Preferably, said monitoring means operates to monitor utilization of carrier frequencies corresponding to each beam, and said control means is responsive to said monitoring means to control switching of communications calls between said carrier frequencies during said calls.

Preferably, said monitoring means operates to monitor utilization of carrier frequencies corresponding to each said beam, and said control means is responsive to said monitoring means to control switching of communications calls between different carrier frequencies on a same beam.

Preferably, said monitoring means operates to monitor utilization of carrier frequencies corresponding to each said beam, and said control means is responsive to said monitoring means to control switching of transceivers between different said beams.

Preferably, transmission and reception are effected through a common antenna aperture.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Specific examples according to the present invention will be described as a possible solution to frequency reuse restrictions on downlink paths in the known North American D-AMPS cellular radio system operating in according with IS-54 and IS136. However, the methods disclosed herein are more broadly applicable to other cellular radio technologies, including Groupe Système Mobile (GSM), PCS1900, Code Division Multiple Access (CDMA) and Time Division Multiple Access (TDMA) technologies.

The conventional North American digital AMPS cellular radio system comprises an analogue mobile standard, which also has provision for a digital time division multiple access (TDMA) mobile telephony standard compatible with the analogue mobile standard. The North American digital AMPS is also referred to as International Standard IS-54, which is an analogue/digital dual mode standard operating at 850 MHz band, and more recently superseded by International Standard IS-136 dual mode analogue/digital mobile standard encompassing operation at 850 MHz band and 1900 MHz band. The D-AMPS standard includes a constraint on the downlink which precludes the use of using individually steered beams for each subscriber mobile station.

The D-AMPS standards dictate that on the downlink, the base station must maintain a constant level transmission during a full duration of a frame on any particular bearer channel, whenever at least one mobile has been assigned to that bearer. It is not possible to devise a scheme which allows beams to be dynamically moved from one mobile direction to another from one time slot to the next.

Thus, a downlink beam former for D-AMPS has to use a spatially fixed beam approach, where the mobile station is passed from beam to beam as it moves geographically, and an optimum beam for communicating with a mobile station is at any one time selected by uplink measurements of signal quality. Since the D-AMPS radio standard prohibits beam steering of a radiation beam on a time slot by time slot basis within a digital frame, mobile stations leaving an area covered by a spatially fixed beam need to communicate with the base transceiver station via an adjacent neighboring beam.

Figure 5:
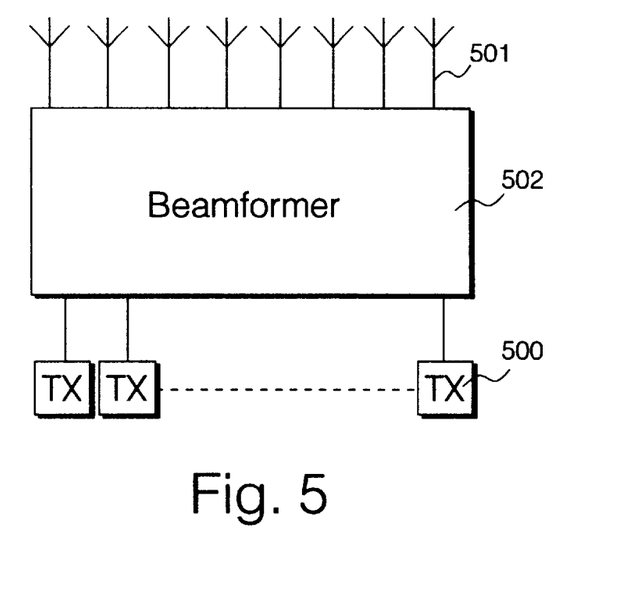
FIG. 5 illustrates schematically an antenna arrangement operating a fixed beam, fixed transceiver arrangement for allocating carrier frequencies to a plurality of fixed beams.

Two options which are available to deal with mobile stations which move across a plurality of spatially fixed radiation beams are as follows:

Firstly, in a spatially fixed beam, fixed transceiver configuration as shown schematically in FIG. 5 herein, a plurality of transceivers 500 each operating at a separate carrier frequency are each permanently connected to a corresponding respective radiation beam emanating from antenna array 501, the transceivers being connected to the antenna array through a beam former 502.

Figure 6:
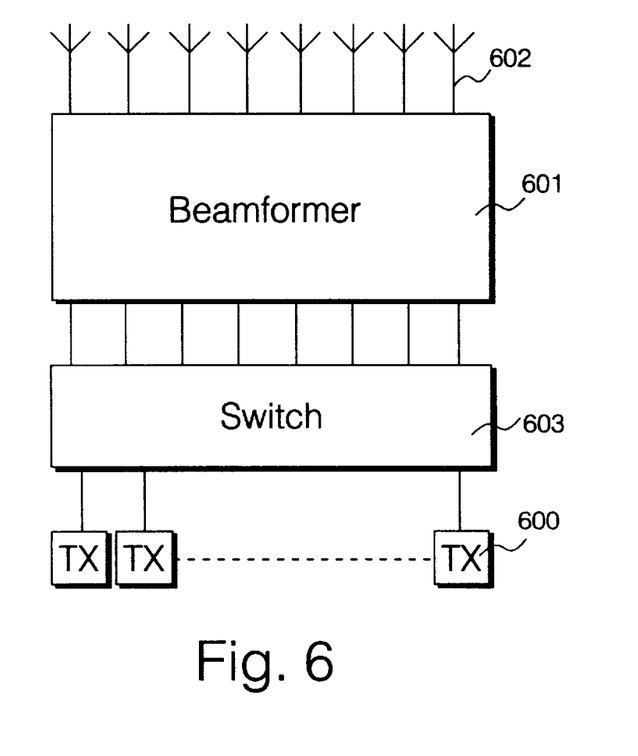
FIG. 6 illustrates schematically an antenna arrangement operating a floating transceiver arrangement in which a plurality of transceivers are allowed to float anywhere across a plurality of fixed beams.

Secondly, in a spatially fixed beam, switched carrier frequency arrangement, as illustrated schematically in FIG. 6 herein, a plurality of transceivers 600, each operating at a respective corresponding carrier frequency, the plurality of carrier frequencies being selected so as to be non-interfering with each other, are connected to a beam former 600 and antenna array 601 through a switch device 603 covering a cell sector. The switch 603 is capable of connecting any transceiver to any of a plurality of beams formed by the beam former 601 and antenna array 602 so that each transceiver can "float" across all beams. At any time one transceiver can reside on only one beam in a sector. In the switched frequency arrangement, when it is determined that a stronger signal is available from a mobile station on a neighboring beam, then a downlink carrier frequency can be switched across to the neighboring beam, instead of hand-over of the call between carrier frequencies being implemented. A benefit of this to the mobile station is that no carrier frequency to carrier frequency hand-overs are required, thereby avoiding degrading call quality.

In the best mode described herein, a plurality of transceivers are permitted to "float" across a plurality of beams in a sector. A frequency grooming process is used to minimize the number of carrier frequencies used by any one beam at any given moment in time. Unused transceivers each operate on a different respective carrier frequency and are held in a reserve pool of transceivers, and deployed upon demand to any beam requiring additional capacity. By maintaining a reserve pool of available transceivers, each operating at a corresponding respective carrier frequency, and allowing any carrier frequency to be connected at any one time to any beam, the usual trunking loss incurred by prior art conventional fixed sectorization, fixed assignment systems may be alleviated.

The frequency grooming process requires that the number of partially loaded transceivers which have vacant channel capacity are minimized, in order to free-up transceivers to be returned back to the reserve pool. This requires that mobile stations communicating via partially loaded transceivers are handed over to other transceivers operating at other carrier frequencies.

A capacity advantage of the switched frequency scheme may exist compared to the fixed frequency fixed beam scheme, which can be significant, as shown by the following example. A capacity advantage of the switched frequency fixed beam scheme will exist compared to the fixed frequency fixed beam scheme, which can be significant, as shown by the following example.

Suppose a trisectored D-AMPS cellular system with four beams per sector operates for the purposes of example only with sixteen voice traffic transceivers per sector. Ignoring control channels, this represents 16×3 (timeslots)=48 trunks per sector. With a fixed frequency architecture, four transceivers would be assigned to each beam. Using Erlang tables, this corresponds to a traffic capacity of 26.4 Erlangs at 2% blocking probability. With a switched frequency architecture, using floating transceivers, the worst-case trunking loss will be 2×($N_b$−1), where $N_b$ represents the number of beams. For the example being considered, this means at least 48−2×(4−1)=42 trunks will be available to carry traffic. This corresponds to a traffic capacity of 32.8 Erlangs at 2% blocking. Thus, the switch frequency approach provides at least a 24% increase in traffic capacity compared to the use of a fixed frequency assignment. A trade-off against the performance advantage of the switched carrier frequency scheme is the fact that the switched beam arrangement may involve significant additionally complexity at the base transceiver station to account for switching.

Figure 7:
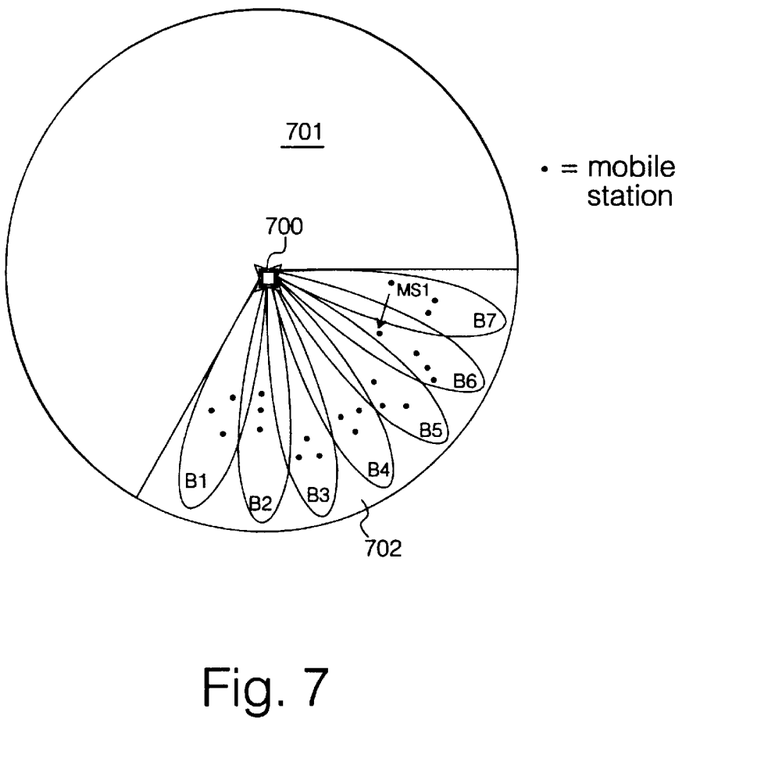
FIG. 7 illustrates a plurality of spatially fixed beams occupying a 120° sector of a cellular radio cell.

An example of operation of the best mode herein is illustrated by the following example. Referring to FIG. 7 herein, there is illustrated schematically in plan view a base transceiver station 700 at the center of a cell 701, radiating in example seven downlink beams B1–B7 over a 120° sector 702. Each beam is substantially spatially fixed, and the beams operate at carrier frequencies which are sufficiently separated from each other so as not to cause interference with each other, or with other beams radiating in adjacent cells. If a mobile station MS1 operating at carrier frequency $f_1$ falling within radiation beam B7 moves out of an area covered by radiation beam B7, and into an area covered by an adjacent radiation beam B6, communication with the base station via beam B7 is lost, and the base transceiver station must communicate with the mobile through beam B6.

The mobile station can resume communication in one of two ways:

Firstly, if it is necessary that the carrier frequency $f_1$ used to support communication whilst in beam B7 remains in beam B7 (for example because of continuing communication with other mobiles in beam B7 and the D-AMPS downlink constraint) then the mobile entering a zone covered by beam B6 must be handed over to another carrier frequency on beam B6. In this case, the vacant channel on carrier frequency $f_1$ created by the exit of the mobile station MS2 and adjacent beam can be occupied by other cells in beam B7. It may be possible to rearrange calls carried out on other underutilized carrier frequencies on beam B7 onto carrier frequency $f_1$ to obtain a totally vacant carrier frequency on beam B7 which can then be removed from beam B1 and reallocated elsewhere.

Secondly, if the carrier frequency $f_1$ supporting the mobile in beam B7 becomes vacant when the mobile leaves the zone covered by beam B7, (because the mobile station MS1 was the only mobile station supported by that carrier frequency), then the carrier frequency $f_1$ can be referred from beam B7 and switched to beam B6, and can continue to support mobile MS1 in the zone covered by beam B6, and so no frequency hand over of mobile MS1 is necessary.

Whilst the example in FIG. 7 relates to the downlink, the operation of uplink beam zones of gain sensitivity for communication between the mobile stations and the base transceiver station can be made equivalent, although the number of uplink beams issuing from the base transceiver station 700 may be different to the number of downlink radiation beams issuing from the same base transceiver station.

Figure 8:
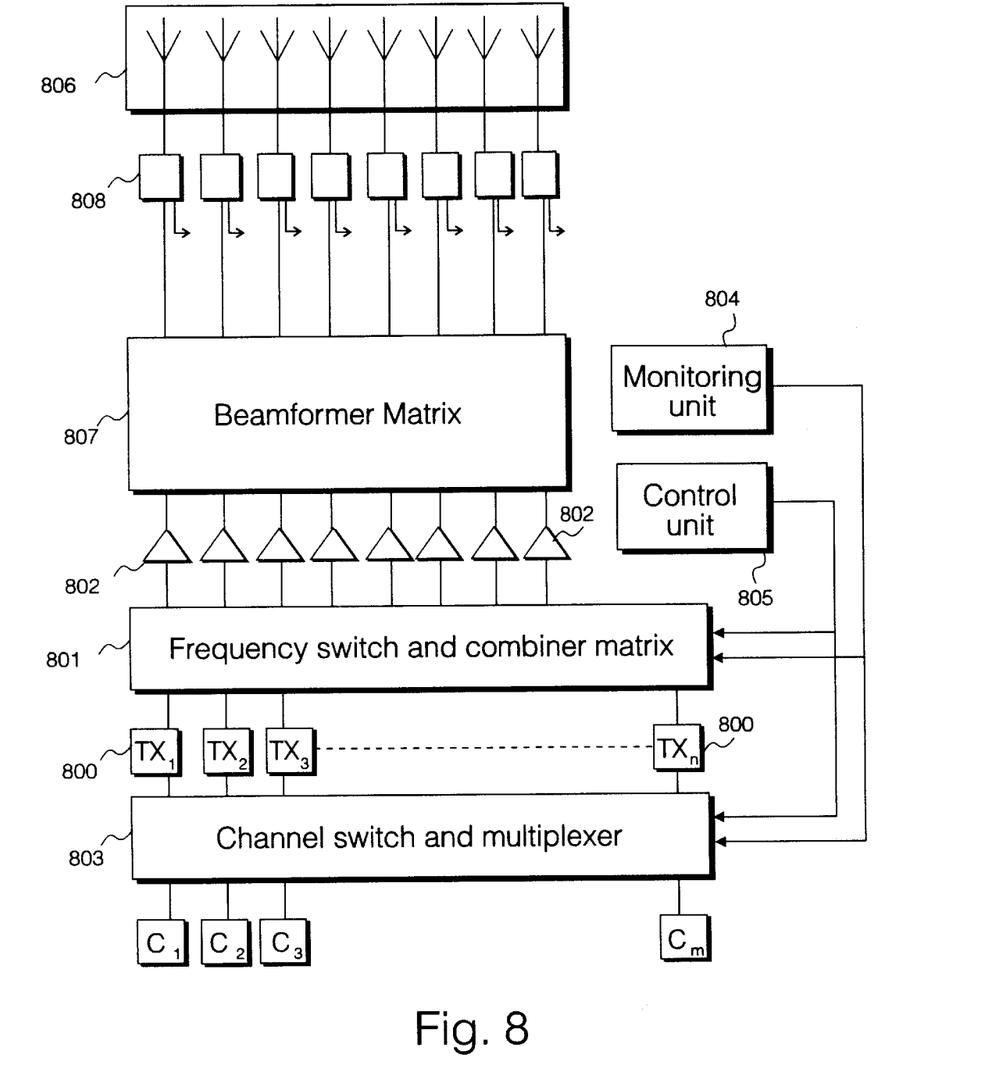
FIG. 8 illustrates an antenna arrangement according to a specific embodiment of a best mode of the invention, wherein a plurality of transceivers can float anywhere across a plurality of spatially fixed beams in a cellular radio system.

Referring to FIG. 8 herein, there is shown schematically a specific embodiment of an antenna arrangement according to the present invention for a base transceiver station of a cellular radio system, the antenna arrangement capable of implementing a specific frequency allocation method according to the present invention. The antenna arrangement shown may be suitable for a single sector of a tri-sectorized cell, however it will be appreciated that the architecture shown is applicable to adaptation for serving a plurality of sectors of a cell. The antenna arrangement comprises a plurality of transceivers $Tx_1$ to $Tx_n$, 800 each capable of outputting a multiplexed digital communications signal supporting a plurality of corresponding respective communications channels, each said transceiver operating at a corresponding respective carrier frequency; a transceiver switch and combiner matrix 801 switching a plurality of said carrier frequency signals of the respective transceivers 800 into a plurality of power amplifiers 802; a plurality of communications channel signal sources $C_1$ to $C_m$ the channel signal sources being input to a channel switch and time division multiplexer device 803, which is capable of switching any channel signal to any transceiver such that a plurality of said channel signals can be multiplexed onto any carrier frequency in any combination; a monitor means 804 for monitoring a number of carrier frequencies assigned to each beam, and monitoring a number of communications channels allocated to each carrier frequency, and whether those communications channels are vacant, or occupied by communications signals; and a control means 805 operating to control the frequency switch and combiner matrix 801 for switching the transceivers to the beams and to control allocation of carrier frequencies to beams accordingly, the control means being responsive to the monitoring means for controlling switching of communications calls between carrier frequencies during communications calls by operating the channel switch and multiplexer device 803 to effect switching of the communications channel signal sources C1–Cm to individual ones of the plurality of transceivers $TX_1$–$TX_n$ a multi-element antenna array 806 for transmitting and receiving a plurality of spatially fixed directional beams; a beam former matrix 807 for forming a plurality of beams at multi-element antenna array 806; and a plurality of diplexors 808 positioned between said beam former matrix 807 and said antenna array 806 for separating uplink and downlink communications signals.

Each transceiver $TX_1$–$TX_n$ operates at a respective different carrier frequency, and carries a plurality of communications channels, for example in the form of time division multiple access time slots. A carrier frequency may be allocated to any one of a plurality of beams formed by the antenna array 806, and beam former matrix 807, the corresponding transceiver being switched to the appropriate selected beam by the switch and combiner matrix 801, under control of the control unit 805. The combination of the channel switch and multiplexer device 803 receiving communications channel signals from each of the communications channel signal sources $C_1$–$C_m$ and the transceiver switch and combiner matrix 801 receiving signals from each of the transceivers $TX_1$–$TX_n$ allows any communications channel to be placed on any transceiver, and an output of any transceiver to be placed on any beam. Thus, channels can be reallocated as between transceivers ie reallocated as between carrier frequencies, and carrier frequencies can be reallocated as between beams.

Whilst the embodiment of FIG. 8 illustrates a downlink beam forming arrangement, the principles and methods described herein are equally applicable to an uplink beam forming arrangement, where instead of a beam of radiation being formed as in the downlink case, in the uplink case, the beam comprises a zone of gain sensitivity from which signals received by a mobile station are accepted.

Figure 9:
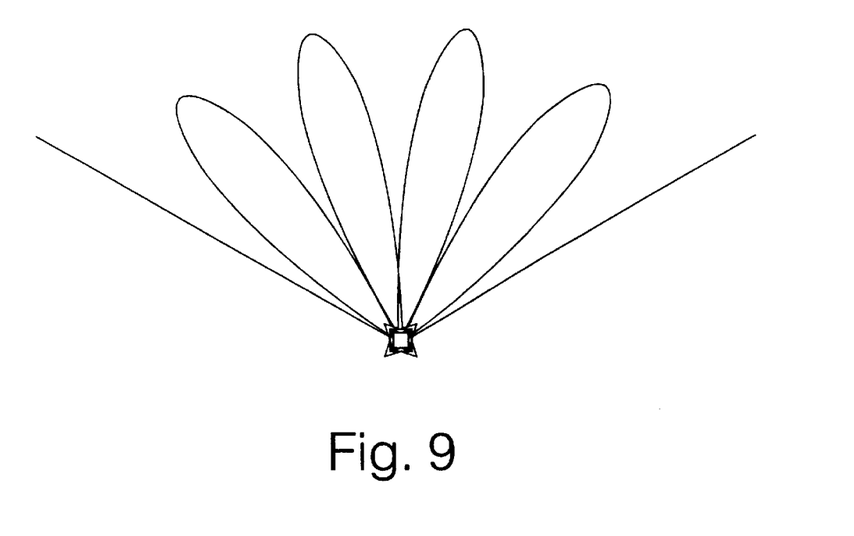
FIG. 9 illustrates a plurality of spatially fixed beams occupying a 120° sector of a cellular radio cell area.

Referring herein to FIG. 9, there is illustrated schematically in plan view a 120° sector of a cell occupied by four spatially fixed downlink radiation beams, each having an angular beam width of around 30° at a −4 dB contour. The four radiating beams are an example of beams formed by the antenna array of FIG. 8 comprising eight antenna elements, or depending upon how the beam former matrix 807 is configured, the eight element antenna array may form a different number of beams, for example seven beams covering the 120° sector. Each beam comprises a number of different carrier frequencies, the number being variable for each beam, and being controllable by the control unit 805 which controls the transceiver switch and combiner matrix 801 for allocating different transceivers to the different beams according to a demand for communications calls from mobile stations falling within the sector. For example, where mobile stations are relatively evenly distributed across the sector, the number of carrier frequencies allocated to each beam will be the same or similar as from beam to beam. However, where a concentration of mobile station occur in a zone covered by a particular beam, more carrier frequencies may be allocated to that beam in order to satisfy capacity demand from the mobile stations.

When a capacity hotspot occurs, with a large number of mobile stations falling within an area covered by single beam, the number of carrier frequencies comprising the beam can be increased to a level that there are sufficient time slots to support communications with all mobile stations in the beam. The number of mobile stations within a radiation beam are determined from the number of uplink signals corresponding to the number of mobile stations. Data concerning the number of mobile stations is input into monitor and control units 804, 805 which operate a frequency allocation algorithm for allocating frequencies to the spatially fixed beams as shown.

Operation of a specific method according to the present invention will now be described.

Where a new mobile station enters an area covered by a beam, the base transceiver station receives a call from the mobile. The monitor unit 804 and control unit 805 operate algorithms to maintain data describing the number of mobile stations within a sector served by the antenna arrangement. The data is arranged as:

data describing a pool set of available carrier frequencies (each corresponding to a respective transceiver) which can be allocated to beams covering a sector without interfering with adjacent sectors or adjacent cells within predetermined interference rules;

data describing the current carrier frequencies assigned to the beams (and the respective transceivers), and current mobile stations assigned to those carrier frequencies.

Figure 10:
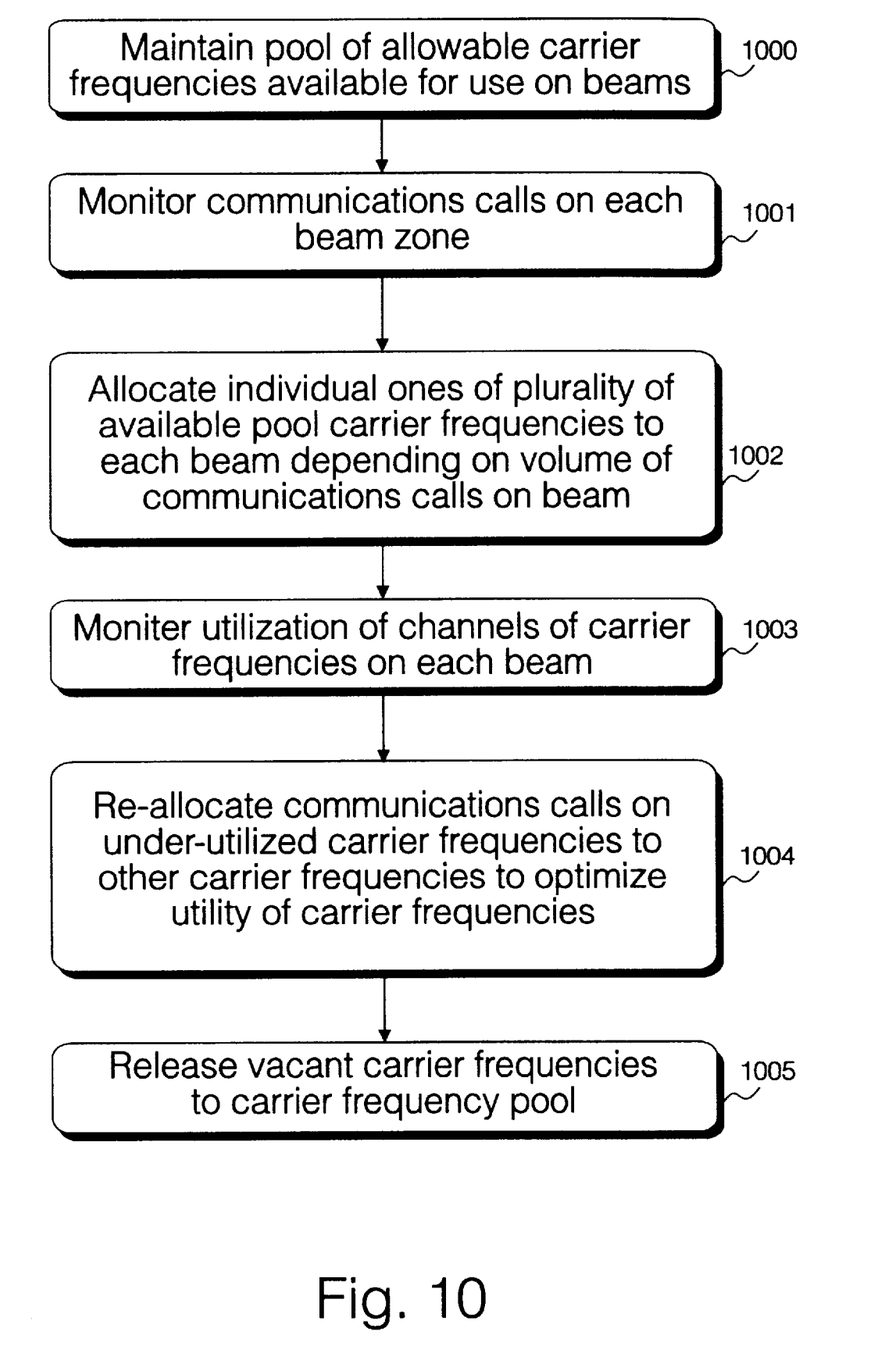
FIG. 10 illustrates in general overview a frequency allocation method according to the best mode herein.

Referring to FIG. 10 herein, a process operated by the monitoring unit and control unit to monitor the carrier frequencies assigned to beams, the occupancy of those carrier frequencies by communications signals, and the switching of carrier frequencies and channels to beams is described in general overview. In the best mode herein the process is implemented as an algorithm carried out by a processor comprising the monitor unit 804 and control unit 805. In step 1000, there is maintained a pool of allowable carrier frequencies which are available for use on beams. These are carrier frequencies which are currently unassigned to any radiation beam and are held in reserve in order to be allocated to beams to fulfill user demand from mobile stations. In step 1001, the monitoring unit 804 monitors communications calls on each beam of the antenna, and maintains data concerning the number of carrier frequencies on each beam, and the occupancy of the communications channels comprising those carrier frequencies. Depending upon the number of incoming calls monitored on the uplink, in step 1002 individual carrier frequencies are allocated to each beam on the uplink and downlink beams having zones corresponding to those mobile station demanding communications calls. Carrier frequencies which are selected for allocation to beams may be selected from the pool on a random basis. The reason for this is that where a plurality of base stations are operating, if all base stations were to select carrier frequencies from the available frequency spectrum in a predetermined manner, certain frequencies would be selected in preference to other frequencies, and the probability of blocking between different sectors or different base stations may increase due to a bias towards selection of certain frequencies. By ensuring selecting of carrier frequencies from the pool is made on a random basis, the probability of interference with other sectors and other base stations may be randomized, resulting in a reduced carrier to interference ratio. Additionally, this also helps randomize interference from co-channel cells. In step 1003 the utilization of channels of the carrier frequencies on each beam is monitored by the monitoring means 804.

In step 1004 communications calls which are occupying underutilized carrier frequencies on a beam, ie carrier frequencies having number of vacant communications channels or time slots are reallocated to other carrier frequencies on the same beam. If any beams has more than a predetermined number of vacant channels taking account of all of its carrier frequencies, and there are enough vacant channels to comprise a number of channels carried by a single carrier frequency, then potentially, by rearranging the communications channels on the other carrier frequencies of that beam, a carrier frequency can be freed-up for reallocation to another beam in step 1005. The monitoring and control units operate a "frequency grooming" process as described hereinafter for minimizing the number of carrier frequencies allocated to any beam, consistent with the demanded user capacity in a spatial zone covered by that beam. In step 1005, any carrier frequencies released by the frequency grooming process are reallocated to the pool set of unused carrier frequencies. This is effected by the monitoring unit and control unit controlling the switch and combiner matrix 801 to disconnect an available transceiver, released as part of the frequency grooming process, by disconnecting it from its beam.

The frequency grooming process may be constrained so as to operate on a carrier only during gaps in communications data transfer, eg during natural gaps in speech, so that any degradation due to hand over can be better tolerated. A plurality of individual communications channels as a carrier frequency may be monitored for communications data activity, and when communications data is not being transmitted, the frequency grooming process may be activated.

Figure 11:
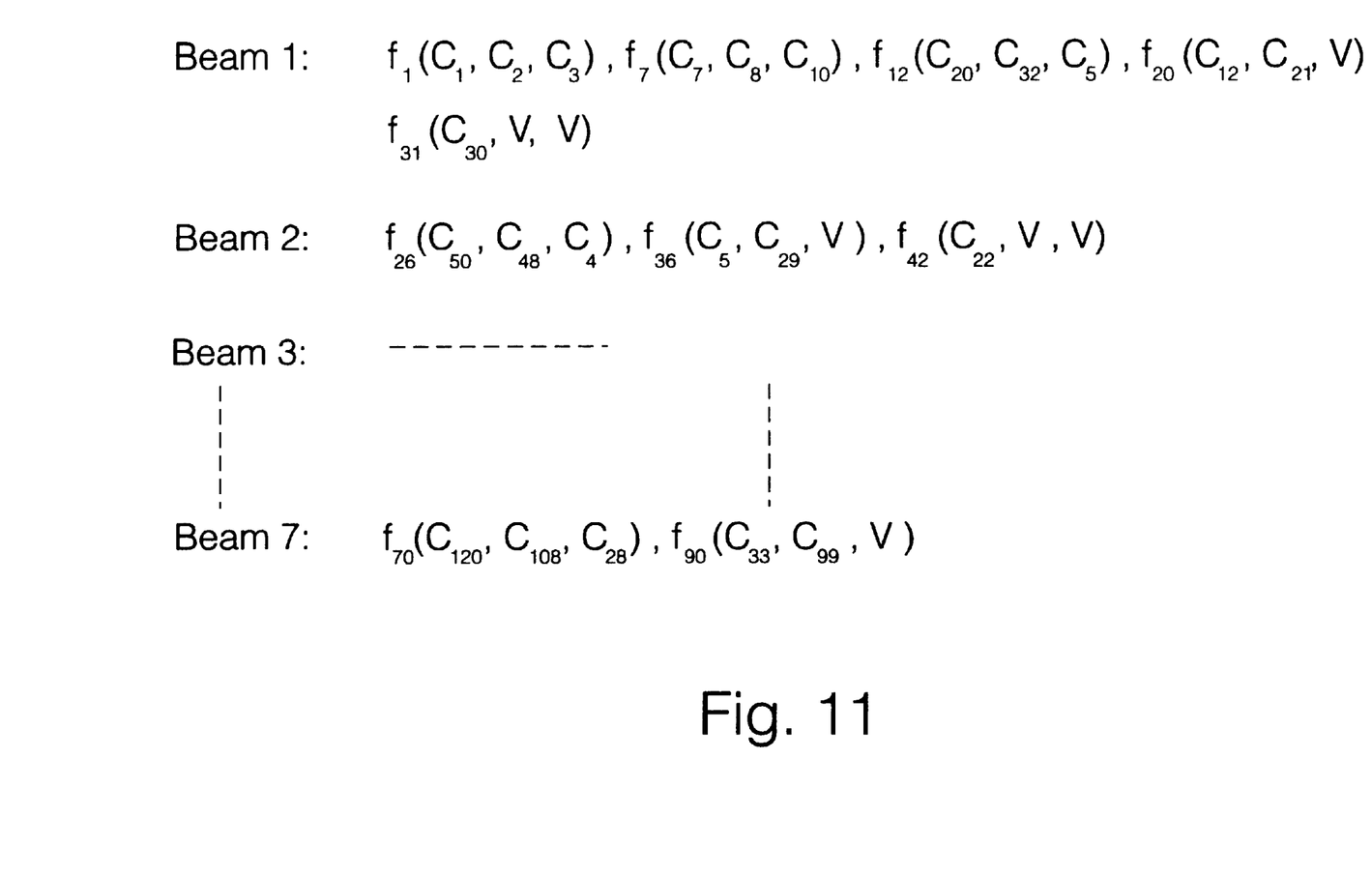
FIG. 11 illustrates schematically an arrangement of data held by a specific embodiment antenna arrangement according to a best mode herein.

In FIG. 11 herein, there is illustrated an example of data held by the monitor unit 804 and control unit 805. This example related to a time division multiplexer system, where each transceiver operating at a corresponding carrier frequency carries a plurality of time division multiplexed channels. The data held includes a list of each of the beams B1–B7, and their corresponding frequencies currently comprising those beams, and the corresponding communication channels, each corresponding to a respective transceiver carried by those carrier frequencies. For example in FIG. 11, beam B1 comprises carrier frequencies $f_1$, $f_7$, $f_{12}$, $f_{20}$, $f_{31}$. Carrier frequency $f_1$ carries channels $C_1$, $C_2$, $C_3$, each of the three time slot pairs in TDMA-3 system transmission being occupied. On the other hand, carrier frequency $f_{20}$ carries channels $C_{12}$, $C_{21}$ in two of the time slot pairs, and a third time slot in the frame is vacant (indicated by V). Similarly, carrier frequency $F_{31}$ carries one channel $C_{30}$, and has two vacant time slot pairs within a frame.

Figure 12:
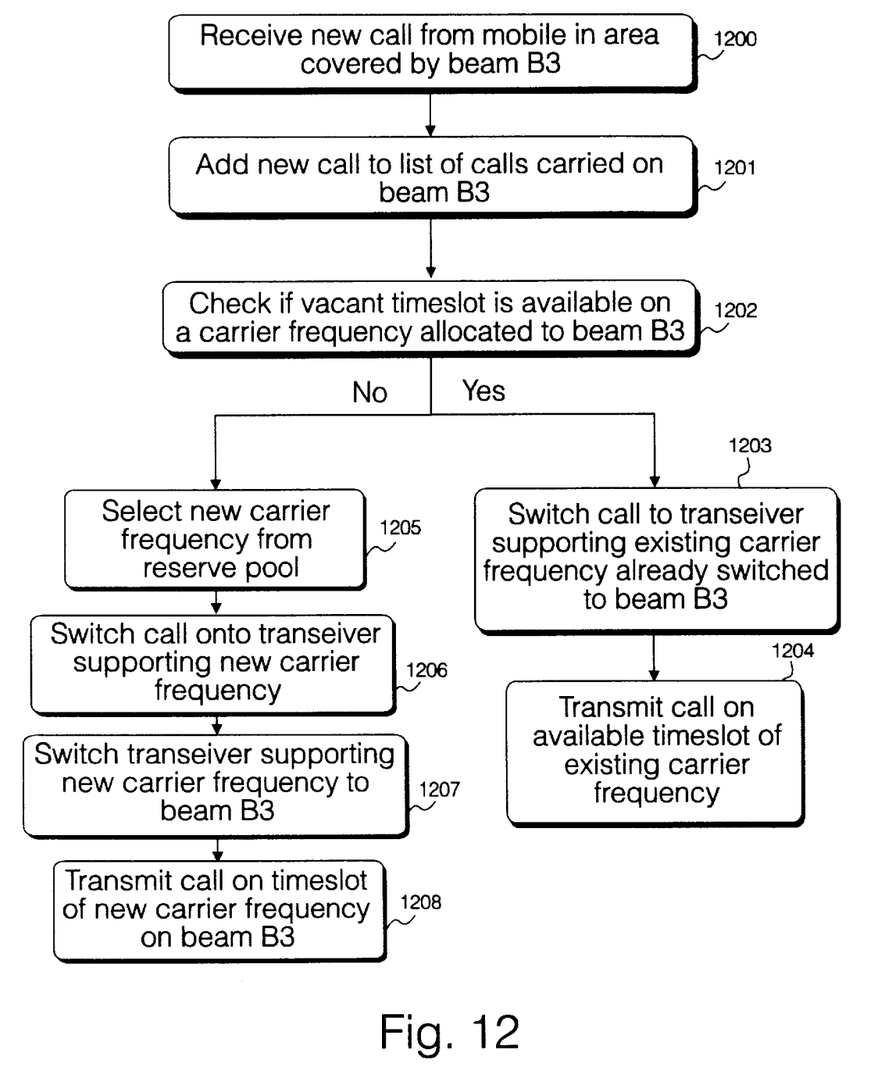
FIG. 12 illustrates a specific example of a frequency allocation method according to a specific example method of the best mode herein.

There will now be described an operation of the antenna arrangement upon receiving a request for call capacity by a new mobile station in a zone covered by a beam, eg beam B3. Referring to FIG. 12 herein in step 1201, the monitor unit 1004 and control unit 805 adds the new call from the new mobile to the list of calls carried on beam B3 and in step 1202, checks all existing carrier frequencies on beam B3 to see if there is a carrier frequency having a vacant time slot which can carry the call to the new mobile station in the area covered by beam B3. If there is a vacant time slot, as is the case in the data described in FIG. 11, in step 1203 a channel source supporting the call to the mobile station is switched to a carrier frequency having a vacant time slot, for example carrier frequency $f_{20}$, which is formed into the radiation beam B3 through the combiner matrix 801, power amplifier 802, beam former matrix 807, and antenna array 806. In step 1204 the call is transmitted on an available time slot on the existing carrier frequency on beam B3.

However, in the case where there is no available vacant time slot on any of the carrier frequencies comprising beam B3, in step 1205 a new carrier frequency is selected from the reserve pool of carrier frequencies. The new carrier frequency is selected so as to be non-interfering with other carrier frequencies radiating in adjacent sectors. In step 1206, the call to the new mobile transceiver connected via channel switch and time division multiplexer 803 to the corresponding frequency transceiver source of the new carrier frequency. In step 1207, the new carrier frequency supporting the call in one of its time slots is switched onto beam B3 and in step 1208, the call is transmitted in a time slot of the new carrier frequency on beam B3.

Thus, in the best mode herein as mobile stations are added on to a beam, the number of carrier frequencies comprising the beam are increased to cater for the increased required capacity to support communications with the increased number of mobile stations. For a call originating in zone covered by more than one beam on the uplink or downlink, the control algorithm operated by the control unit determines which beam to use, after considering the traffic loading of each beam in the zone. The monitor unit 804 and control unit 805 operate an algorithm to add in new carrier frequencies onto a particular beam which is experiencing a high demand for capacity. However, as mobile stations end their calls, or move out of the beam, time slots on carrier frequencies previously assigned to a specific beam become vacant and are freed up for use. The monitor unit 804 and control unit 805 operate a frequency grooming algorithm, which implements a frequency grooming process for optimizing the assignment of calls to carrier frequencies, and optimizing the number of carrier frequencies comprising each beam.

Figure 13:
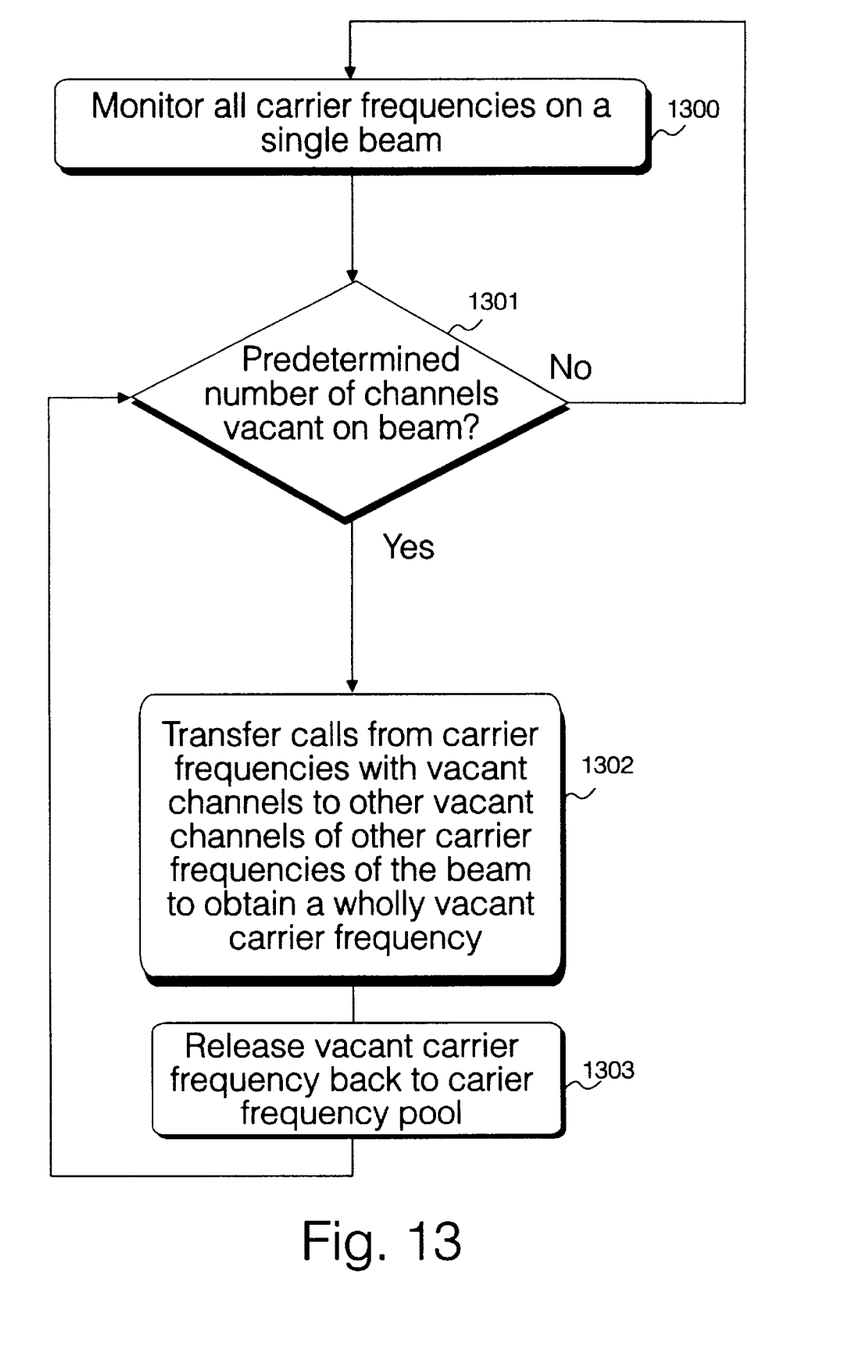
FIG. 13 illustrates schematically a specific example of a frequency grooming method according to a best mode of the invention herein.

Referring to FIG. 13 herein, there is shown schematically in overview a process for monitoring each beam in a sector continuously and for grooming out underutilized carrier frequencies. In step 1300 all carrier frequencies on a single beam are continuously monitored. In step 1301 if a beam has a predetermined number of vacant channels, on any combination of the carrier frequencies comprising that beam, in step 1302, calls occupying carrier frequencies having vacant channels are transferred to other carrier frequencies on that beam having vacant channels if these are available, the object being to concentrate the communications calls into channels on the minimum number of carrier frequencies per beam, thereby allowing a vacant carrier frequency to appear, which can be removed from the beam in step 1303, and be returned to the reserve pool of carrier frequencies available for deployment over any of the beams, to deal with future capacity demands. In step 1301 if a predetermined number of vacant channels do not appear on the beam, then the beam is deemed to be optimally configured, regarding the number of carrier frequencies allocated to the beam, and the algorithm continues to monitor the beam in step 1300. Each beam in the sector is monitored continuously, with the object of optimizing the number of carrier frequencies on the beam, and utilizing the channels of the carrier frequencies comprising the beams to obtain the highest possible occupancy of channels by calls.

There will now be described in more detail a specific example of a frequency grooming operation according to the best mode herein.

Figure 14:
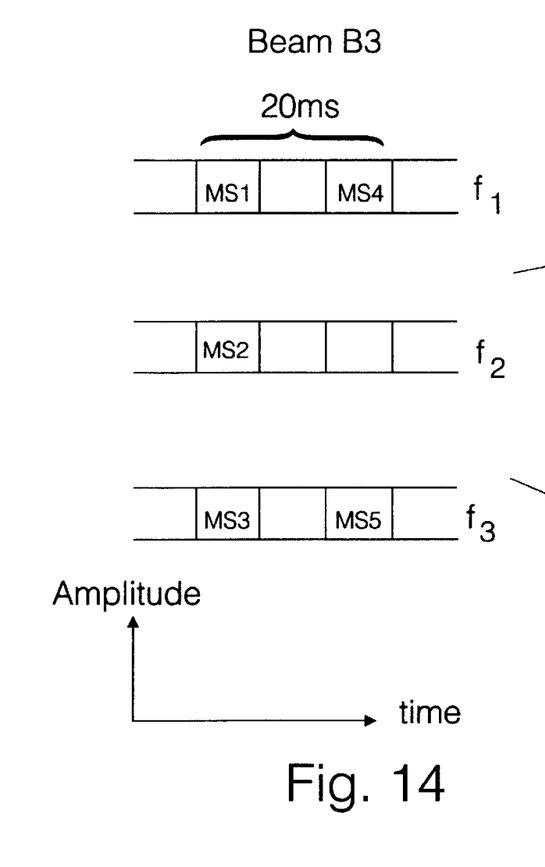
FIGS. 14, 15 and 16 illustrate schematically a specific example of operation of a frequency grooming process according to a best mode described herein.

Referring to FIG. 14 herein, there is illustrated an example of a grooming process for minimizing a number of carrier frequencies used by each beam in a sector. If, for example, five mobile stations MS1–MS5 were present in an area covered by beam B3, as shown in FIG. 14, the five mobile stations may be being supported by three carrier frequencies $f_1$, $f_3$ shown in FIG. 14 herein, where a three time slot time divisional multiple access multiplexing regime (TDMA-3) is operating. Each carrier frequency is divided into a number of time frames, each time frame comprising three time slots. Each time slot in a frame comprises a separate communications channel for communicating with a separate mobile station. In the example of FIG. 14, the five mobile stations MS1–MS5 are supported five of the nine time slots provided by the three carriers $f_1$–$f_3$. Each of carrier frequencies $f_1$ and $f_3$ have an unoccupied channel, ie an unoccupied time slot in each frame. Second carrier frequency $f_2$ has two unoccupied time slots, corresponding to two unoccupied channels. The monitoring means monitors the number of carrier frequencies occupying beam B3 and finds the three carrier frequencies $f_1$–$f_3$. The monitoring means also monitors the number of time slots per frame occupied by calls, for each carrier frequency of the beam B3, and determines, in the case of FIG. 14, that two time slots per frame are occupied by calls carried by carrier frequency $f_1$ and similarly for carrier frequency $f_3$, two time slots per frame are occupied by-calls to mobiles MS3, MS5. However, for carrier frequency $f_2$, only one time slot per frame is occupied by a call, in this case mobile station MS2, leaving two free unoccupied time slots per frame on carrier $f_2$.

Figure 15:
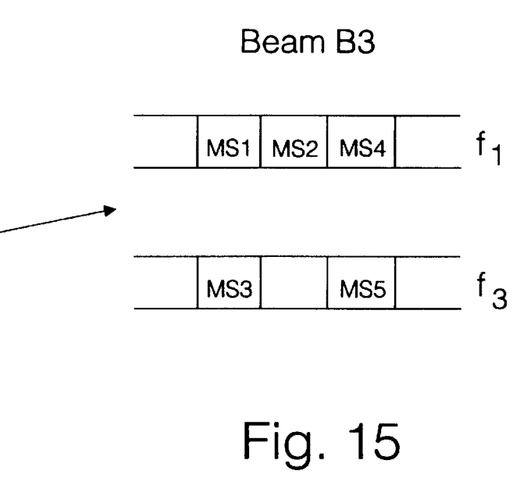
Figure 16:
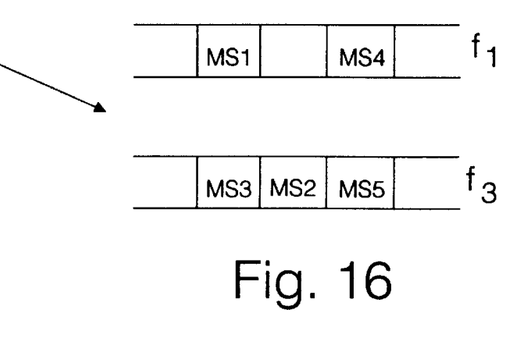

The monitoring means reallocates the call to mobile station MS2 within geographical area covered by beam B3 to another carrier frequency comprising beam B3. Two options are possible. The call to mobile station MS2 can be moved to a vacant time slot in carrier frequency $f_1$, or to a vacant time slot in carrier frequency $f_3$. The two options are shown in FIGS. 15 and 16 respectively. The monitoring means operates the algorithm, and the control unit generates signals which redirect the call to mobile station MS2 from underutilized carrier frequency $f_2$, to a vacant time slot in either of carrier frequencies $f_1$ or $f_3$.

The monitoring means maintains a table, in the form of an electronic database, containing information concerning the allocation of calls/time slots to carrier frequencies. The grooming algorithm continuously inspects the time slot/frequency allocation table searching for underutilized carrier frequencies, and if a time slot occupying an underutilized carrier frequency on a beam can be moved to another carrier frequency on the same beam, the grooming algorithm generates grooming data, in the form of grooming signals, instructing the reallocation of a time slot to another carrier frequency on the same beam. In the case of TDMA-3, the grooming algorithm seeks to ensure that there are no more than two free time slots on any one carrier frequency assigned to a beam. If a carrier frequency having more than two free time slots is assigned to a particular beam, ie an underutilized carrier frequency, then the frequency allocation algorithm reallocates the underutilized carrier frequency to the reserve pool of carrier frequencies.

After reallocation of a call to a vacant time slot in a carrier frequency of the same beam B3, this leaves the previously underutilized carrier frequency $f_2$ empty, ie carrying no communications to the mobile stations. The frequency allocation algorithm operated by the monitoring means operates to return unused carrier frequency $f_2$ to the reserve pool of carrier frequencies, resulting in beam B3 comprising only two carrier frequencies $f_1$, $f_3$ carrying calls to five mobiles MS1–MS5.

Although a specific embodiment and method in the best mode herein makes use of time division multiplexed channels, the methods according to the present invention are not restricted to use of time division multiplexed channels, but are restricted solely by the features of the claims herein. Similarly, whilst the best mode described herein has detailed description with respect to a downlink radiation beam, methods according to the present invention as recited in the claims herein encompass uplink beams.

REFERENCE

[1] "A Spectrum Efficient Cellular Base Station Antenna Architecture", S C Swales and M A Beach, Personal and Mobile Radio Communications Conference, Warwick, United Kingdom 1991.

[2] "Proposed Advanced Base Station Antennas for Future Cellular Mobile Radio Systems", W S Davies, R J Long and E Vinnal, Australian Telecoms Research, Vol 22, No 1, pp53–60.

ABBREVIATION

CDMA Code Division Multiple Access
GSM Groupe Système Mobile
TDMA Time Division Multiple Access

What is claimed is:

1. In a cellular radio communications system comprising:
    a plurality of transceivers each operating a transmission signal at a different carrier frequency; and
    an antenna arrangement capable of operating a plurality of directional beams,
    a method of allocating a set of carrier frequencies comprising a plurality of communications channels to said plurality of beams, wherein:
        any said carrier frequency can be allocated to any said beam; and
        a variable number of said carrier frequencies can be allocated to a particular beam according to a communications traffic requirements, said method comprising the steps of:
            reviewing on a continuous basis a number of carrier frequencies allocated to each said beam; and
            minimizing a number of carrier frequencies allocated to each said beam at any one time by reallocating said channels among said carrier frequencies.

2. A method as claimed in claim 1 comprising the steps of:
    reviewing on a continuous basis a number of carrier frequencies allocated to each said beam; and
    minimizing a number of carrier frequencies allocated to each said beam at any one time.

3. A method as claimed in claim 1, comprising the step of:
    maintaining a pool set of said transceivers in an unallocated state in which respective carrier frequencies of said pool set of transceivers are unallocated to any said beam.

4. A method as claimed in claim 1, wherein a said carrier frequency comprises a plurality of communications channels.

5. A method as claimed in claim 4, wherein said plurality of communications channels comprise time division multiplexed time slots.

6. A method as claimed in claim 1, wherein said beams are spatially fixed.

7. A method as claimed in claim 1, comprising the step of:

for a call originating in a zone covered by more than one said beam, determining an allocation of which beam to use, depending upon a traffic loading of each of said covering beams covering said zone.

8. A method of allocating a plurality of carrier frequencies to a plurality of radiation beams generated by an antenna of a cellular radio system, wherein each said carrier frequency is multiplexed to carry a plurality of communications channels, said method comprising the steps of:

for a said beam:
monitoring a number of channels for each carrier frequency of said beam;
monitoring a demand for communications calls on said beam, and when a new communications call is required to be added to said beam,
if a vacant channel is available on an existing carrier frequency of said beam, adding said communications call to said existing carrier frequency of the beam, and
if a vacant channel is unavailable on an existing carrier frequency of said beam, allocating a new carrier frequency to the beam.

9. A method of reallocating a plurality of carrier frequencies of a beam of an antenna of a cellular radio system, wherein each said carrier frequency carries a plurality of communications channels, said method comprising the steps of:

monitoring said plurality of channels on said beam; and
if said beam has more than a predetermined number of vacant channels, reallocating any utilized channels between said plurality of carrier frequencies of said beam; and
removing a said carrier frequency from said beam.

10. A method as claimed in claim 3, wherein said step of re-allocating said utilized channels is constrained to occur during gaps in communication on said utilized channels.

11. A method as claimed in claim 10, wherein each carrier frequency carries a number of channels and said predetermined number is at least said number of channels carried by a carrier frequency.

12. A base station antenna arrangement comprising:

an antenna capable of forming a plurality of directional beams;
a plurality of transceivers, each said transceiver operating at a different carrier frequency;
a switch matrix means operating to switch any said transceiver to any said beam;
a monitoring means for monitoring a number of carrier frequencies comprising a plurality of communications channels assigned to a said beam; and
a control means operating to determine allocation of said carrier frequencies to said beams to control said switch matrix to swich said transceivers to said beams accordingly;
wherein said monitoring means operates to monitor utilization of carrier frequencies corresponding to each beam, and
said controls means is responsive to said monitoring means to control switching of communications calls between said carrier frequencies during said calls such that said channels are reallocated among said carrier frequencies.

13. An antenna arrangement as claimed in claim 12, wherein said monitoring means operates to monitor utilization of carrier frequencies corresponding to each said beam; and said control means is responsive to said monitoring means to control switching of communications calls between different carrier frequencies on a same beam.

14. An antenna arrangement as claimed in claim 12, wherein said monitoring means operates to monitor utilization of carrier frequencies corresponding to each said beam; and
said control means is responsive to said monitoring means to control switching of transceivers between different said beams.

15. An arrangement as claimed in claim 12, wherein transmission and reception are effected through a common antenna aperture.

* * * * *